US010525829B2

(12) United States Patent
Girlando et al.

(10) Patent No.: US 10,525,829 B2
(45) Date of Patent: Jan. 7, 2020

(54) AWD TRANSVERSE POWERTRAIN WITH REAR WHEEL BIAS FIELD

(71) Applicant: Magna Powertrain of America, Inc., Troy, MI (US)

(72) Inventors: Matthew G. Girlando, Rochester Hills, MI (US); John D. Zalewski, Lake Orion, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 247 days.

(21) Appl. No.: 15/505,257

(22) PCT Filed: Sep. 11, 2015

(86) PCT No.: PCT/IB2015/002004
§ 371 (c)(1),
(2) Date: Feb. 21, 2017

(87) PCT Pub. No.: WO2016/038465
PCT Pub. Date: Mar. 17, 2016

(65) Prior Publication Data
US 2017/0246953 A1    Aug. 31, 2017

Related U.S. Application Data

(60) Provisional application No. 62/049,572, filed on Sep. 12, 2014.

(51) Int. Cl.
*B60K 17/346* (2006.01)
*B60K 17/02* (2006.01)
(Continued)

(52) U.S. Cl.
CPC .......... *B60K 17/3462* (2013.01); *B60K 17/02* (2013.01); *B60K 17/35* (2013.01); *F16D 13/52* (2013.01)

(58) Field of Classification Search
CPC .. B60K 17/3462; B60K 17/02; B60K 17/344; B60K 17/35; B60K 17/3515; B60Y 2400/421; B60Y 2400/424; F16D 13/52
(Continued)

(56) References Cited

U.S. PATENT DOCUMENTS 6,513,615 B2    2/2003   Bowen et al.
7,150,694 B2    12/2006  Mizon et al.
(Continued)

FOREIGN PATENT DOCUMENTS

DE    102013200938 A1    8/2013
EP       1508466 A1      2/2005

OTHER PUBLICATIONS

International Search Report and Written Opinion dated Feb. 16, 2016 from International Patent Application Serial No. PCT/IB2015/002004.

*Primary Examiner* — Jacob D Knutson
(74) *Attorney, Agent, or Firm* — Dickinson Wright PLLC

(57) ABSTRACT

An AWD drivetrain is configured to primarily direct drive torque from a transversely-aligned powertrain assembly through an auxiliary power transfer unit to a rear driveline and selectively transmit drive torque to a front driveline via actuation of at least one power-operated clutch. The auxiliary power transfer unit includes an input component drivingly connected to the powertrain assembly, and an output component connected to the input component by a hypoid gearset The output component is operatively connected to the rear driveline and is configured to normally transfer the drive torque to the rear driveline.

20 Claims, 10 Drawing Sheets

(51) Int. Cl.
*B60K 17/35* (2006.01)
*F16D 13/52* (2006.01)

(58) Field of Classification Search
USPC .......................................................... 180/248
See application file for complete search history.

(56) References Cited

U.S. PATENT DOCUMENTS

| | | | |
|---|---|---|---|
| 8,388,486 B2 | 3/2013 | Ekonen et al. | |
| 2005/0202918 A1 | 9/2005 | Mizon et al. | |
| 2007/0023249 A1 | 2/2007 | Schranz et al. | |
| 2010/0062891 A1* | 3/2010 | Ekonen | B60K 23/0808 475/223 |
| 2011/0275470 A1* | 11/2011 | Ekonen | B60K 17/35 475/198 |
| 2011/0319213 A1* | 12/2011 | Ekonen | B60K 17/35 475/86 |
| 2012/0024614 A1* | 2/2012 | Sigmund | B60K 23/0808 180/248 |
| 2013/0303324 A1* | 11/2013 | Valente | F16H 37/082 475/204 |
| 2013/0337960 A1* | 12/2013 | Valente | B60K 23/08 475/198 |
| 2014/0174253 A1* | 6/2014 | Stephens | B60K 17/22 74/665 F |

\* cited by examiner

AWD TRANSVERSE POWERTRAIN WITH REAR WHEEL BIAS FIELD

CROSS REFERENCE TO RELATED APPLICATION

This application claims the benefit of U.S. provisional application Ser. No. 62/049,572, filed Sep. 12, 2014, the entire disclosure of which is incorporated herein by reference.

BACKGROUND

1. Field

The present disclosure relates generally to all-wheel drive (AWD) motor vehicles having a transversely-mounted engine and transmission powertrain assembly and, more particularly, to incorporation of an auxiliary power transfer unit (PTU) into the AWD vehicle and which is configured to provide primary power to the rear driveline and supplemental power to the front driveline.

2. Related Art

This section provides background information related to the present disclosure which is not necessarily prior art.

In recent years, there has been a significant increase in the demand for motor vehicles equipped with a powertrain and drivelines capable of providing drive torque to all four wheels. Traditionally four-wheel drive (4WD) vehicles are equipped with a longitudinally-extending powertrain assembly (i.e. the internal combustion engine and transmission) that is configured to delivery rotary power (drive torque) to an input of a transfer case which, in turn, is configured to distribute the drive torque to a primary (i.e. rear) driveline and a secondary front) driveline. As is known, many modern transfer cases include a power-operated transfer clutch for automatically transferring drive torque to the front driveline when traction is lost at the rear wheels to define an automatic or "on demand" four-wheel drive mode. In other transfer cases, the power-operated transfer clutch is disposed in association with an inter-axle (i.e. center) differential to distribute drive torque to both drivelines and establish a full-time four-wheel drive mode. Such, four-wheel drive vehicles equipped with transfer cases are typically based on a rear wheel drive (RWD) arrangement.

In contrast to such RWD vehicles, a large portion of modern passenger vehicles have a front wheel drive (FWD) arrangement and are equipped with a transversely-extending powertrain assembly (i.e. the engine and a transaxle). In such FWD vehicles, the front driveline is the primary driveline. In addition, the number of such FWD vehicles also providing an all-wheel drive (AWD) capability is growing and typically include a power take-off unit (PTU) operable for selectively/automatically transmitting a portion of the total drive torque to the rear (secondary) driveline. In many AWD vehicles, a power-operated disconnect clutch is provided in the PTU to selective couple and uncouple an output component of the PTU with respect to an input component of the rear driveline. In such "disconnectable" AWD vehicles, it is also known to incorporate a second power-operated disconnect clutch into the rear driveline. Commonly-owned U.S. Pat. No. 8,388,486 discloses such a single-speed AWD vehicle. A full-time AWD vehicle is disclosed in commonly-owned U.S. Pat. No. 6,513,615. Finally, commonly-owned U.S. Pat. No. 7,150,694 discloses a FWD vehicle having a PTU configured to normally transmit drive torque to the rear driveline and selective control the transmission of a portion of the total drive torque to the front driveline. The entire disclosure of each of the above-noted commonly-owned U.S. patent is incorporated herein by reference.

In view of the above, a need exists to continue development of AWD systems for use in FWD vehicles having a transversely-extending powertrain assembly.

SUMMARY

This section provides a general summary of the disclosure and is not intended to be considered a comprehensive disclosure of its full scope or of all of its features, aspects, objectives and/or advantages.

It is an aspect of the present disclosure to provide an all-wheel drive system for motor vehicles equipped with a transversely-mounted powertrain assembly configured to permanently transmit drive torque to the rear driveline.

It is another aspect to incorporate an auxiliary power transfer unit into the all-wheel drive system of the present disclosure which is configured to normally provide drive torque to the rear (primary) driveline. The auxiliary power transfer unit includes an input driven by the powertrain assembly, an output coupled to the rear driveline, and a hypoid gearset coupling the input to the output. The auxiliary power transfer unit further includes a power-operated transfer clutch configured to selectively transfer drive torque from the input to the front (secondary) driveline.

It is yet another aspect to integrate art auxiliary power transfer unit into the all-wheel drive system of the present disclosure which is configured to normally provide drive torque to the rear (primary) driveline and selectively transmit drive torque to the front (secondary) driveline. The auxiliary power transfer unit includes an input driven by the powertrain assembly, an output coupled to the rear driveline, and a hypoid gearset coupling the input to the output. The input is further coupled to an input component of the secondary driveline such as the differential carrier of a front bevel differential unit. The auxiliary power transfer unit further includes a power-operated biasing clutch configured to selectively couple/uncouple one output component of the front bevel differential unit to its corresponding axleshaft. The biasing clutch can be adaptively controlled to transmit drive torque from the powertrain assembly to the front driveline when operating in a power transfer mode and can also be controlled to disconnect the second driveline while operating in a disconnect mode.

It is a further aspect of the present disclosure to provide an auxiliary power transfer unit for use in a FWD vehicle which is configured to provide drive torque to at least one of a front driveline and a rear driveline. The auxiliary power transfer unit includes input driven by the powertrain assembly, a front differential having a differential input driven by powertrain assembly, a hypoid gearset drivingly coupled to the rear driveline, and a power-operated mode clutch operable for selectively coupling and uncoupling the hypoid gearset with respect to the input. The mode clutch is operable in a first or FWD mode to uncouple the input from the hypoid gearset and in a second or RWD mode to drivingly couple the input to the hypoid gearset. The auxiliary power transfer unit further includes a power-operated biasing/disconnect clutch configured to selectively couple/uncouple one differential output of the front differential to a corresponding axleshaft with the mode clutch operating in its FWD mode, the biasing/disconnect clutch is locked and all drive torque is transferred to the front driveline. With the mode clutch in its RWD mode, the biasing/disconnect clutch is adaptively controlled to provide the AWD functionality.

It is a further aspect of the present disclosure to provide the rear driveline with a propshaft driven by the output of the auxiliary power transfer unit, a rear axle assembly having a rear differential driven by the propshaft, and a power-operated disconnect clutch configured to selectively couple/uncouple the rear differential and at least one of the rear wheels.

In accordance with these aspects, the power-operated clutches may include multi-plate clutch assemblies adaptively controlled via a powered clutch actuator. The powered clutch actuator may be provided with electrical or hydraulic power and operate to control the adaptive engagement of the multi-plate clutch assembly.

In accordance with these and other aspects, the all-wheel drive system provides primary propulsion to the rear wheels while providing adaptive torque biasing to establish an on-demand all-wheel drive mode. This arrangement results in the cost efficiencies typically associated with FWD powertrains while providing the driveability performance typically associated with RWD vehicles.

The present disclosure further acts to meet customer expectations for rear wheel drive performance (i.e. Rear Bias) from a FWD vehicle without the need of implementing a torque-vectoring unit into one of the drivelines, thereby significantly reducing costs and mass.

Further areas of applicability will become apparent from the description provided herein. The description and specific examples in this summary are intended for purposes of illustration only and are not intended to limit the scope of this disclosure.

BRIEF DESCRIPTION OF THE DRAWINGS

The drawings described herein are for illustrative purposes only and relate to the following detailed description wherein.

Corresponding reference numerals indicate corresponding parts throughout the several views of these drawings.

DETAILED DESCRIPTION

Example embodiments will now be move fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
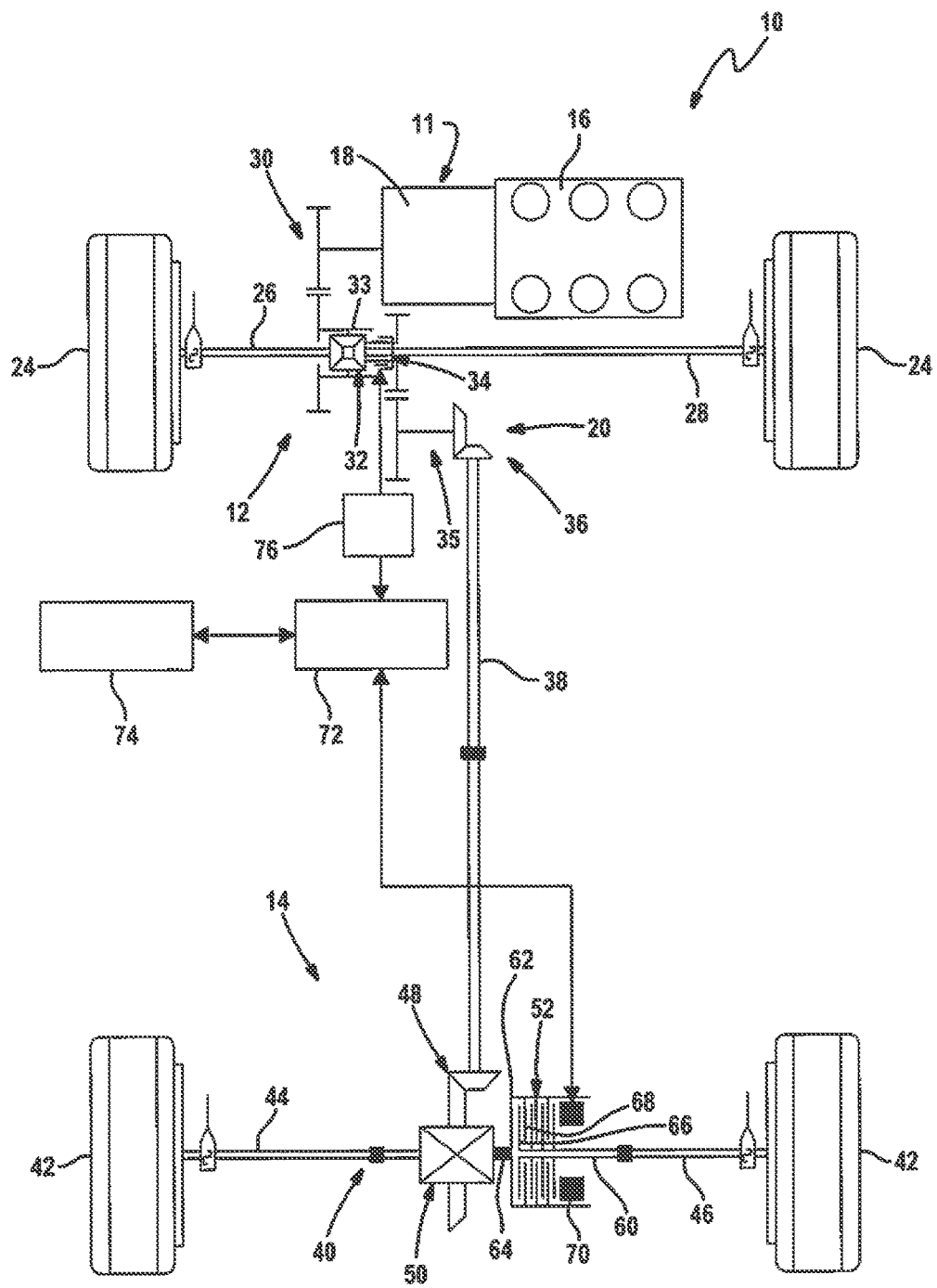
FIG. 1 is a schematic illustration of a conventional all-wheel drive motor vehicle.

In general, each of the vehicular drivetrain arrangement to be described in association with FIGS. 2 through 9 is directed to an improvement over the conventional drivetrain arrangement shown in FIG. 1. Specifically, the present disclosure provides a number of drivetrain arrangements which are integrated into vehicles having a transversely-aligned powertrain assembly and which are configured to primarily transmit drive torque to the rear driveline.

Referring to FIG. 1 of the drawings, a vehicular drivetrain 10 for an all-wheel drive (AWD) vehicle is shown. Drivetrain 10 generally includes a powertrain assembly 11, a front driveline 12 and a rear driveline 14. Powertrain assembly 11 is shown to include a power source, such as an internal combustion engine 16 and a transmission 18 which may be of either the manual or automatic type. Powertrain assembly 11 is transversly-aligned with respect to the longitudinal axis of the vehicle. A power transmission device 20, commonly referred to as a power take-off unit, is operable for transmitting a portion of the drive torque generated by powertrain assembly 11 to rear driveline 14. Front driveline 12 is directly driven by the output of powertrain assembly 11 and is shown to include a pair of front wheels 24 individually connected to front axleshafts 26, 28, and a front differential assembly 32. Front differential assembly 32 is a conventional bevel differential unit having a differential case, at least one pair of pinion gears rata ably supported by the differential ease, and a pair of side gears meshed with the pinion gears. One side gear is connected for rotation with axleshaft 26 while the other side gear is connected for rotation with axleshaft 28. A final drive gearset 30 associated with transmission 18 is provided to drive the differential case, thereby transmitting drive torque from powertrain assembly 11 to front wheels 24 to establish a front-wheel drive (FWD) mode of operation. Transmission 18, final drive gearset 30 and front differential assembly 32 are typically housed with a midi-piece housing to define a "transaxle" unit.

Power transmission device 20 includes a hypoid gearset 36, a transfer gearset 35 drivingly coupled to hypoid gearset 36, and a disconnect clutch 34 operable for selectively coupling and uncoupling transfer gearset 35 with respect to an input component 33 that is driven by one of final drive gearset 30 and the differential case of front differential assembly 32. For example, input component 33 can be a tubular input shaft driven by the differential case and surrounding a portion of axleshaft 28. Clutch 34 is a power-operated clutch assembly and may be configured as a dog clutch, synchronized clutch, roller clutch, multi-plate friction clutch or any other torque transferring/disconnecting mechanism.

Drivetrain 10 is shown with rear driveline 14 including a propshaft 38 connected at one end to hypoid gearset 36 and at a second end to a rear axle assembly 40. Rear driveline 14 also includes a pair of rear wheels 42 individually driven by rear axleshafts 44, 46, a hypoid gearset 48, and a rear differential assembly 50, all of which are associated with rear axle assembly 40. The second end of propshaft 38 is drivingly coupled to hypoid gearset 48. Rear differential assembly 50 is also a bevel differential unit including a differential case driven by hypoid gearset 48, pinion gears rotatably supported by the differential case, and a pair of side gears meshed with the pinion gears. As seen, one of the side gears is drivingly connected to axleshaft 44 while a disconnect coupling 52 is disposed between the other side gear and axleshaft 46. Disconnect coupling 52 is a power-operated device and is shown to include a clutch hub 60 fixed to axleshaft 46, a clutch drum 62 fixed to the second side gear via a stubsbaft 64, a clutch pack of inner and outer clutch plates 66, 68 disposed therebetween, and a powered clutch actuator 70.

A controller 72 is in communication (directly or indirectly) with a variety of vehicle sensors 74 providing data indicative of the vehicles current operating parameters. Controller 72 is configured to control operation of a powered clutch actuator 76 associated with disconnect clutch 34 and powered clutch actuator 70 associated with disconnect coupling 52. With the arrangement shown, drive torque is permanently delivered to front driveline 12 and is selectively transmitted to rear driveline 14 (via actuation of both disconnect clutch 34 and disconnect coupling 52) to establish an all-wheel drive (AWD) mode of operation.

Figure 2:
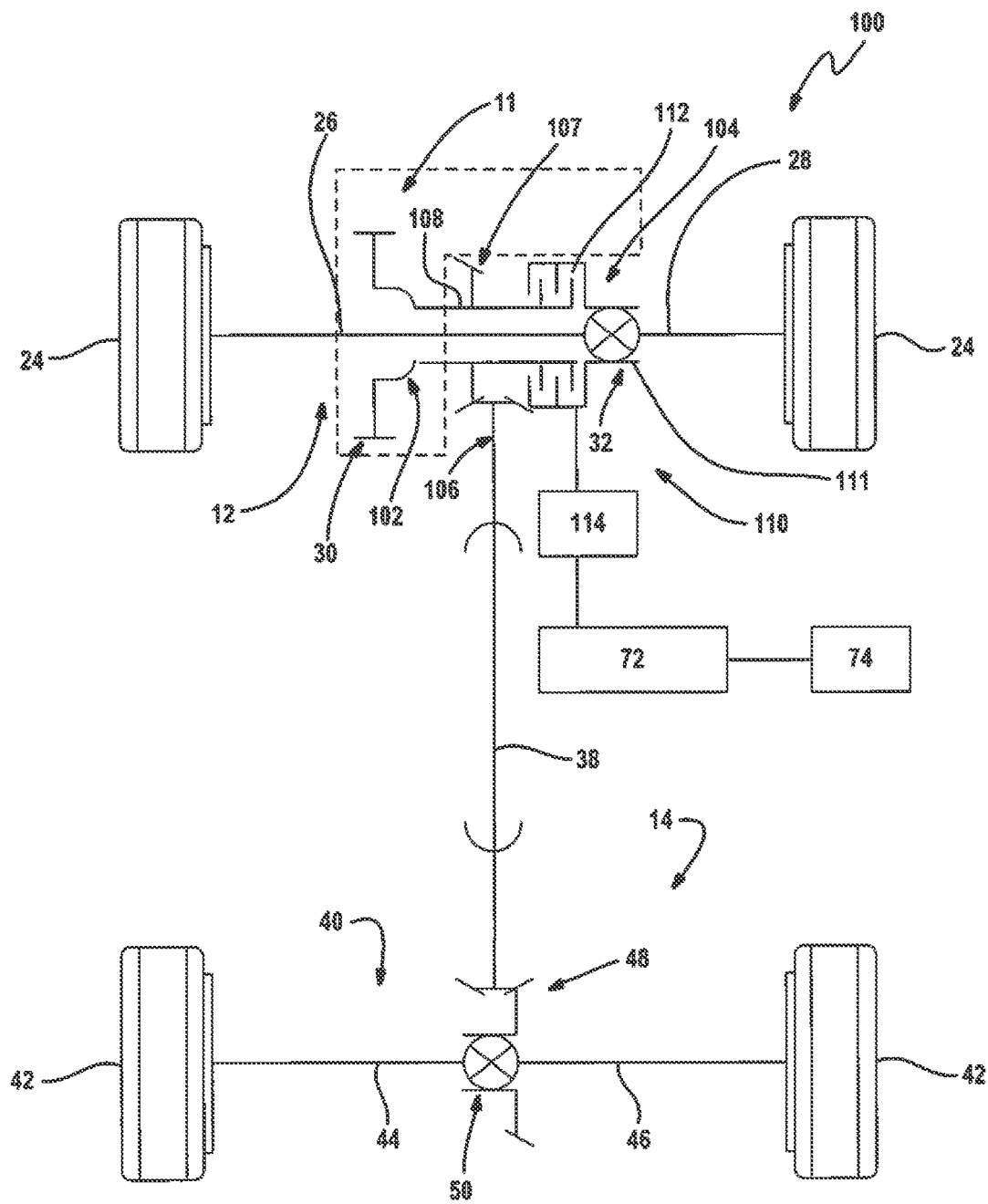
FIG. 2 is a schematic illustration of an all wheel drive motor vehicles equipped with a vehicle drivetrain arrangement according to a first embodiment of the present disclosure.

Referring now to FIG. 2, a vehicular drivetrain 100 is shown to include powertrain assembly 11 with final drive gearset 30 drivingly interconnected to an input component 102 of an auxiliary power transfer unit (PTU) 104. An output component 106 of PTU 104 is connected to propshaft 38 for delivering drive torque directly from powertrain assembly 11 to rear wheels 42 via rear driveline 14 so as to establish a rear-wheel drive (RWD) mode of operation. PTU 104 also includes a right-angled hypoid gearset 107 drivingly interconnecting input component 102 to output component 106. In particular, input component 102 includes a sleeve portion 108 to which a first or ring gear of hypoid gearset 107 is fixed while output component 106 is configured as a pinion shaft. A second or pinion gear of hypoid gearset 107 is fixed to the pinion shaft and in constant mesh with the ring gear. A power-operated transfer or mode clutch 110 is disposed between sleeve portion 108 of input component 102 and a differential input 111 (differential case) of front differential assembly 32. Transfer clutch 110 includes a multi-plate friction clutch unit 112 and a power-operated clutch actuator unit 114 that is adapted to regulate the magnitude of a clutch engagement force applied to friction clutch unit 112. Actuator unit 114 is intended to be shown diagrammatically since it should be interpreted to include any type of powered actuator device capable of adaptively controlling magnitude of the clutch engagement force. Examples include, without limitation, hydraulically-actuated, electromagnetically-actuated, electro mechanically-actuated devices (i.e. pistons, bellramps, cam systems, etc.).

Actuation of transfer clutch 110 is controlled by controller 72. When transfer clutch 110 is fully released, all drive torque is transmitted to rear driveline 14 to establish the rear-wheel drive (RWD) mode. In contrast, actuation of transfer clutch 110 functions to redirect a portion of the total drive torque outputted from powertrain assembly 11 to front driveline 12 for establishing an all-wheel drive (AWD) mode. Adaptive control of clutch actuator unit 114 permits the torque distribution between the front and rear drivelines to be regulated to establish an adaptive or on-demand AWD mode to address and overcome slip and/or poor road conditions.

Figure 3:
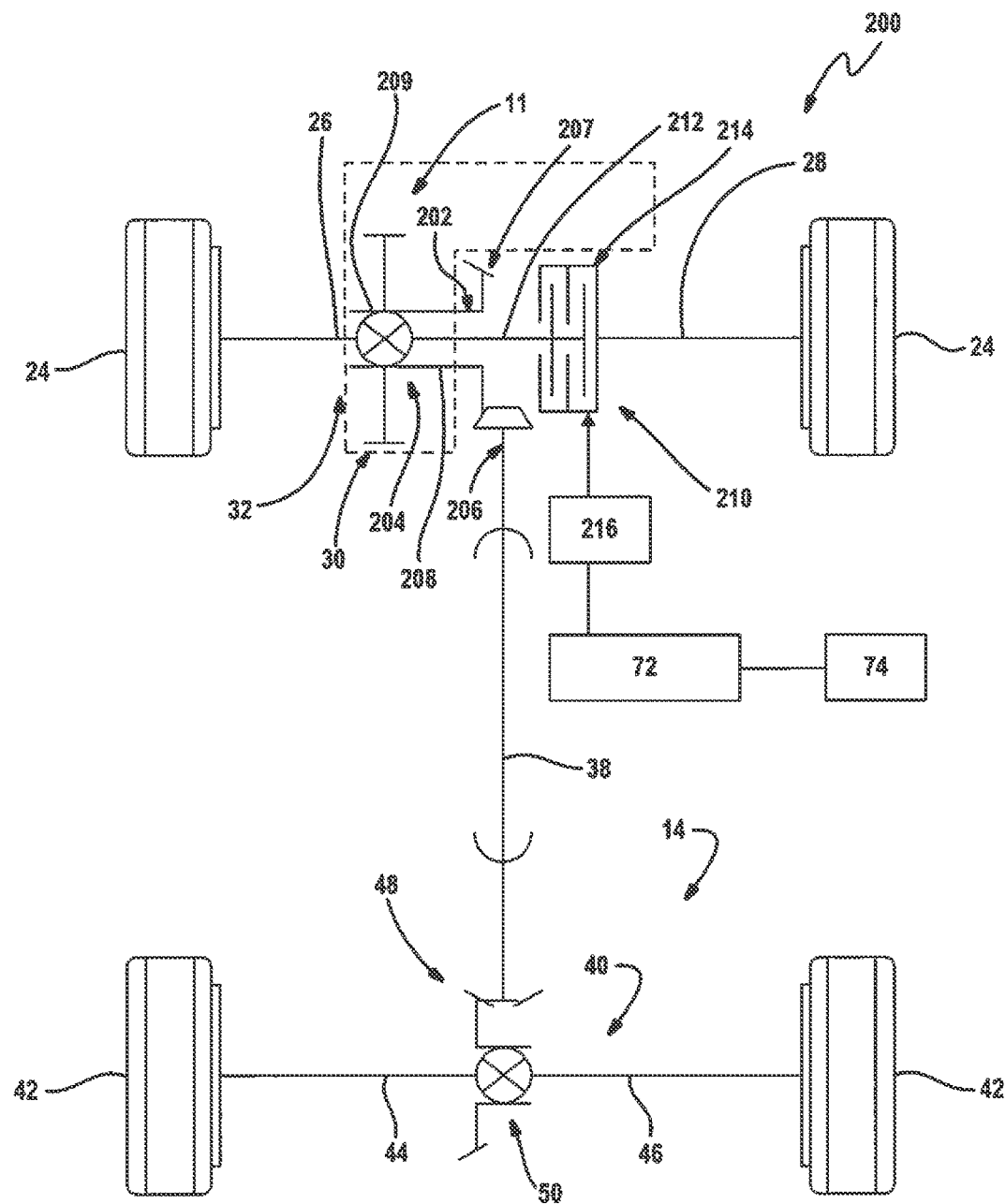
FIG. 3 is a schematic illustration of a vehicle drivetrain arrangement constructed according to a second embodiment of the present disclosure.

Referring now to FIG. 3, an alternative vehicular drivetrain 200 is shown to include powertrain assembly 11 with final drive gearset 30 drivingly connected to an input component 202 of an auxiliary power transfer unit (PTU) 204. An output component 206 of PTU 204 is connected to propshaft 38 for delivering drive torque directly to rear driveline 14 from powertrain assembly 11 for establishing the rear-wheel drive (RWD) mode of operation. PTU 204 also includes a right-angled hypoid gearset 207 drivingly interconnecting input component 202 to output component 206. In particular, input component 202 includes a sleeve shaft 208 to which a first gear of hypoid gearset 207 is fixed while output component 206 is configured as a pinion shaft. A second or pinion gear of hypoid gearset 207 is fixed to the pinion shaft and in constant mesh with the ring gear. An input component 209 of front differential 32 is also drivingly connected to at least one input sleeve shall 208 and final drive gearset 30. A power-operated active biasing disconnect clutch 210 is shown to be disposed between front axleshaft 28 and a stub shaft 212 fixed to one of the differential outputs (one of the side gears) of front differential assembly 32. Biasing/disconnect clutch 210 includes a multi-plate friction clutch unit 214 and a power-operated clutch actuator unit 216. When biasing/disconnect clutch 210 is in a fully released state, all drive torque is transmitted to rear driveline 14 through PTU 204 and the RWD mode is established. However, upon engagement of friction clutch unit 214, torque is transmitted from input component 209 through front differential 32 to front driveline 12. Modulation of the clutch engagement force applied to friction clutch unit 214 results in variable torque distribution between the first and rear drivelines to establish an on-demand AWD mode. As before, controller 72 controls adaptive actuation of actuator unit 216.

Referring now to FIG. 4, an alternative vehicular drivetrain 300 is shown to include final drive gearset 30 that is driven by powertrain assembly 11. An input component 302 of an auxiliary power transfer unit (PTU) 304 is driven by final drive gearset and/or is driven by an input component 306 of front differential assembly 32. An output component 308 of PTU 304 is connected to propshaft 38 and a right-angled hypoid gearset 310 is drivingly coupled to output component 308. As seen, a stub shaft 312 associated with hypoid gearset 310 is journally supported on a tubular shaft portion 314 of input component 302. PTU 304 is also shown to include a power-operated mode clutch 316 having a dog-type clutch unit 317 and a power-operated clutch actuator unit 324. Clutch unit 317 includes a clutch hub 318 fixed to shaft portion 314 of input component 302, a clutch ring 320 fixed to stub shaft 312, and a shift sleeve 322. Shin sleeve 322 is splined for rotation with clutch hub 318 and is axially moveable between a first or FWD position and second or RWD position. In its first mode position, shift sleeve 322 is disengaged from clutch ring 320 such that rear driveline 14 is not driven. In its second mode position, shift sleeve 322 is engaged with clutch ring 320 to establish the RWD operating mode.

As similar to that shown in FIG. 3, drivetrain 300 includes a power-operated active biasing/disconnect clutch 210 that is disposed between axleshaft 28 and stub shaft 212. The structure and function of active biasing/disconnect clutch 210 is identical to previously disclosed. Controller 72 is operable to control shilling of mode clutch 316 and adaptive actuation of active biasing/disconnect clutch 210.

With continued reference to FIG. 4, rear axle assembly 40 is now shown to include a disconnect clutch 330 disposed between axleshaft 44 and one of the side gears associated with rear differential assembly 50. Disconnect clutch 330 is shown to include a friction clutch unit 332 having clutch hub fixed to the side gear, a clutch drum fixed to axleshaft 44, and a multi-plate clutch pack operably disposed therebetween. A power-operated clutch actuator unit 334 controls engagement of friction clutch unit 332. When friction clutch unit 332 is released, rear differential assembly 50 is disengaged from driven connection with rear wheels 42. When friction clutch unit 332 is engaged, drive torque is transmitted through rear differential 50 to rear wheels 42.

When drivetrain 300 is operating in a way to establish the WIND mode, shift sleeve 322 is in its RWD position, biasing/disconnect clutch 210 is released and disconnect clutch 330 is engaged. The AWD mode can be subsequently established by adaptively actuating biasing/disconnect clutch 210 to transfer some drive torque to front driveline 12. To establish the FWD operating mode, shift sleeve 322 is shifted to its FWD mode position, biasing/disconnect clutch 210 is fully engaged (locked) and disconnect clutch 330 is released.

Figure 4A:
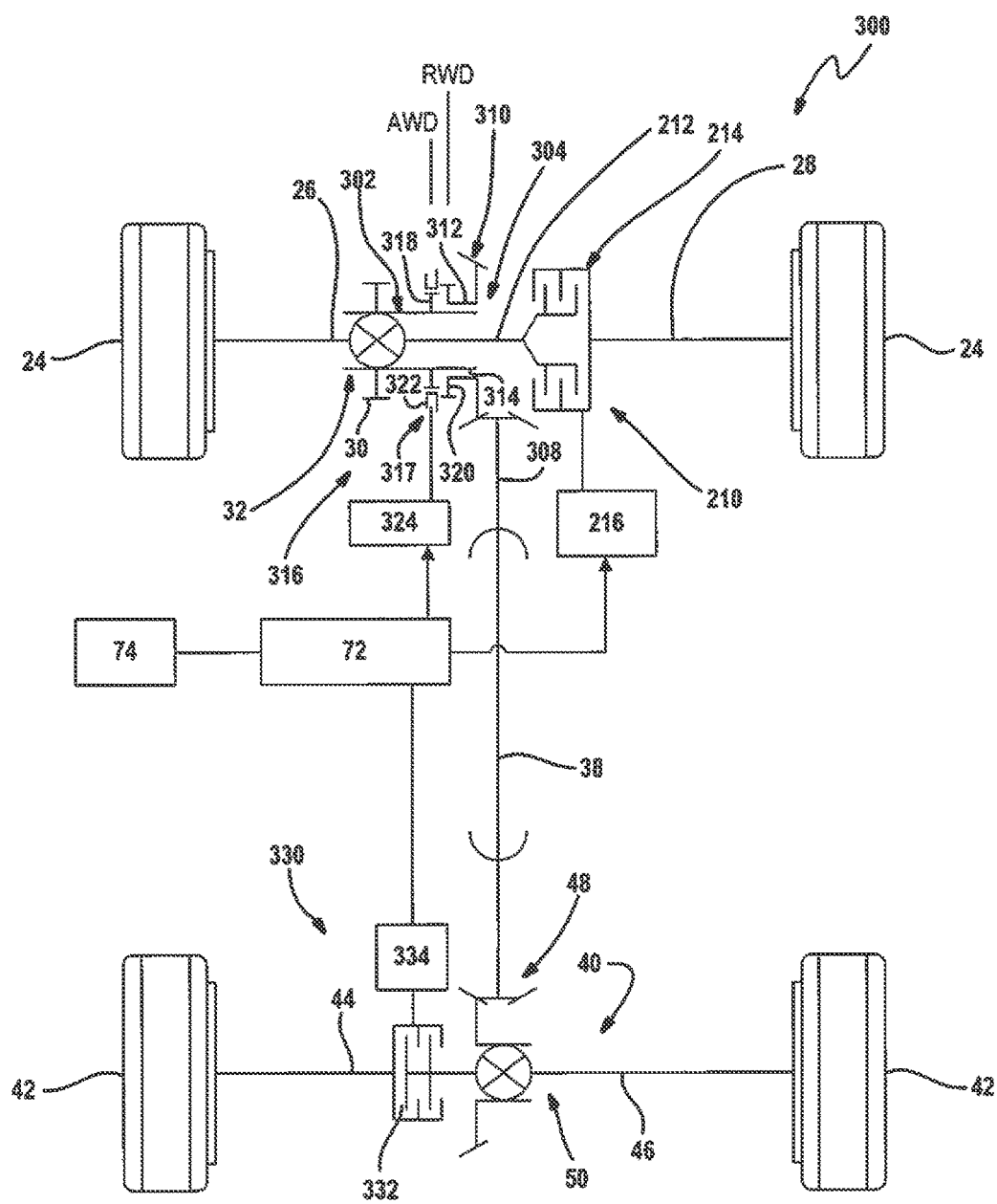
FIG. 4A is a schematic illustration of a vehicle drivetrain arrangement constructed according to a third embodiment of the present disclosure including a multi-plate version of a disconnect clutch.
Figure 4B:
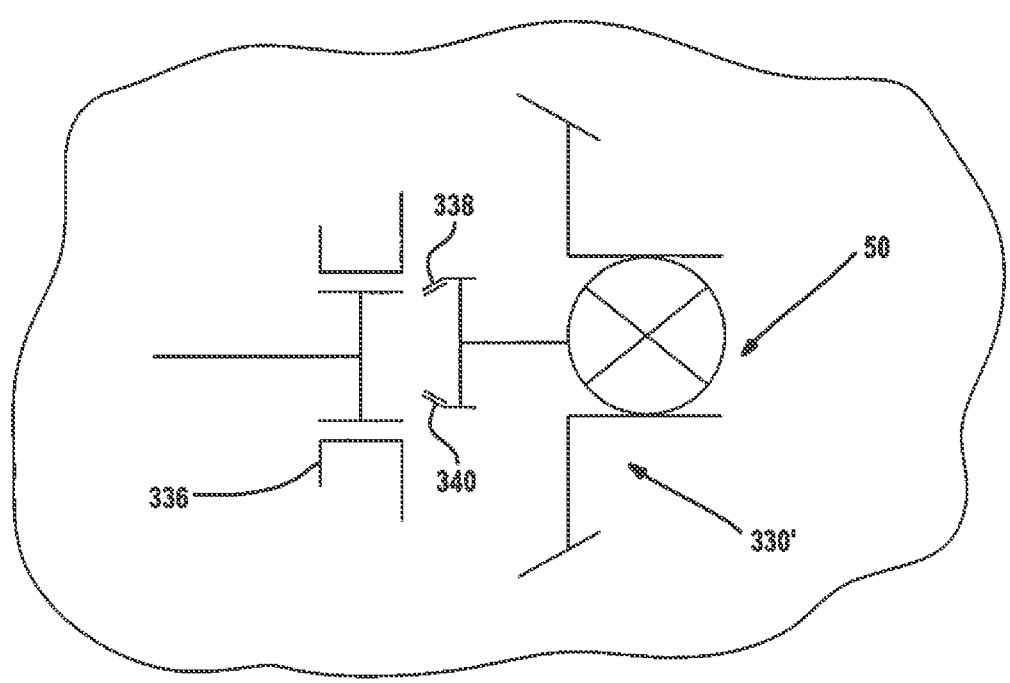
FIG. 4B is an enlarged portion of FIG. 4A wherein the multi-plate version of the disconnect clutch is replaced with a synchronized clutch version.

FIG. 4B illustrates an optional arrangement of a portion of FIG. 4A. In FIG. 4B, the multi-plate version of disconnect clutch 330 is replaced with a synchronized clutch version 330' having a sliding sleeve 336 axially moved by actuator unit 334 between released (shown) and engaged positions relative to a clutch ring 338 that is fixed to a side gear of rear differential assembly 50. A synchronizer 340 is shown operably disposed between sliding sleeve 336 and clutch ring 338 to assist in providing a speed synchronizing function.

Figure 5:
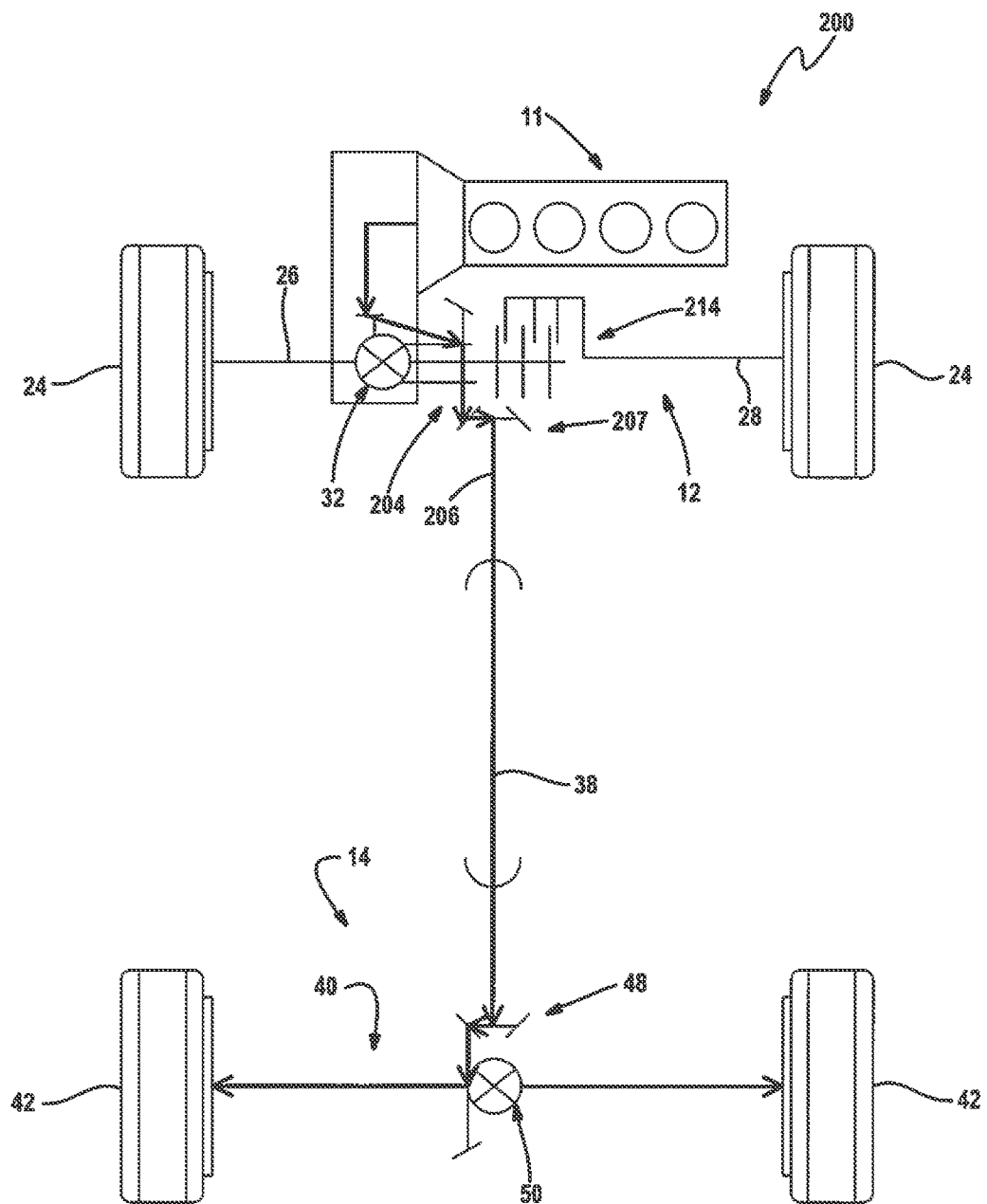
FIGS. 5 and 6 are powerflow diagrams associated with the vehicle drivetrain arrangement shown in FIG. 3.
Figure 6:
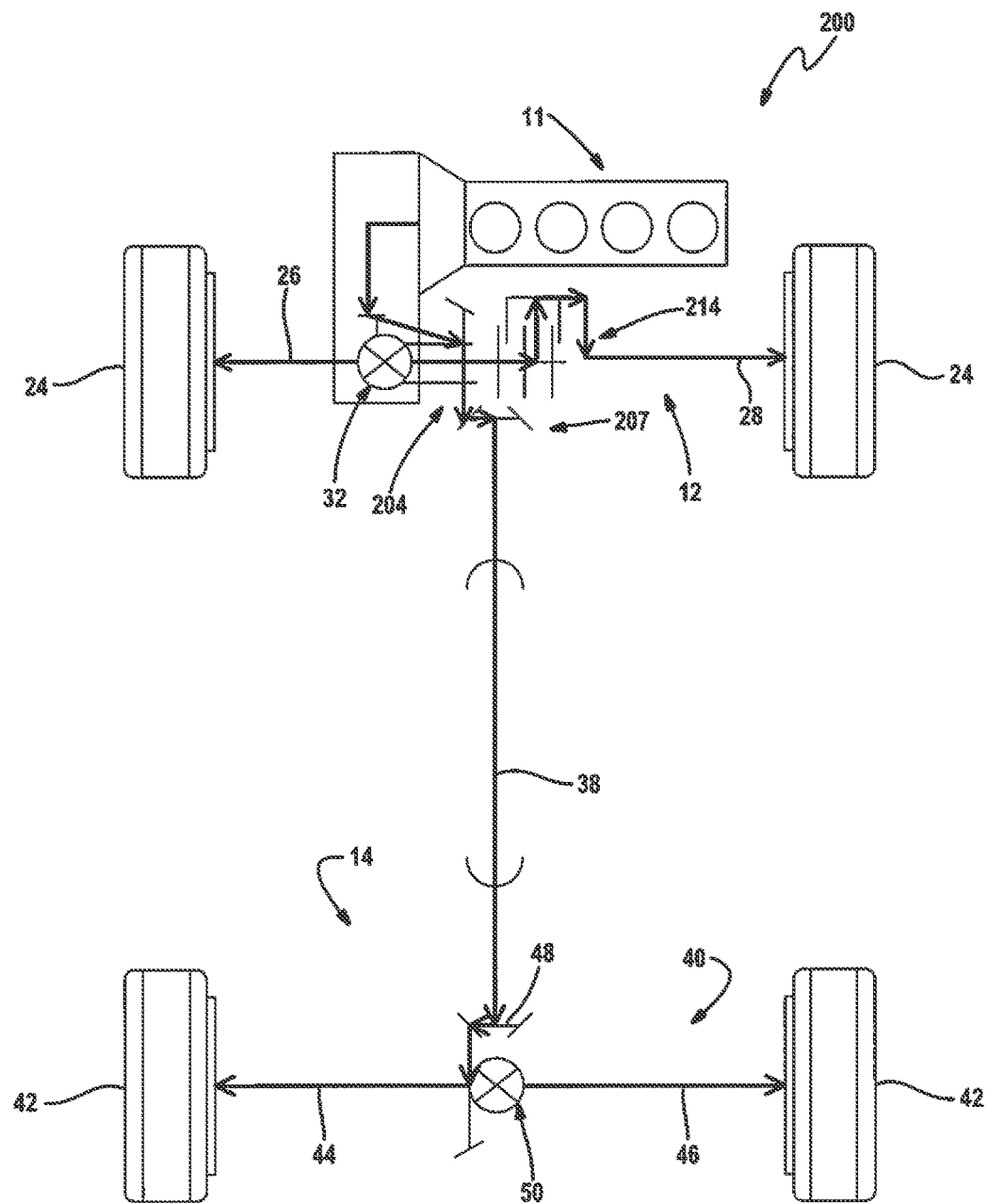
Figure 7:
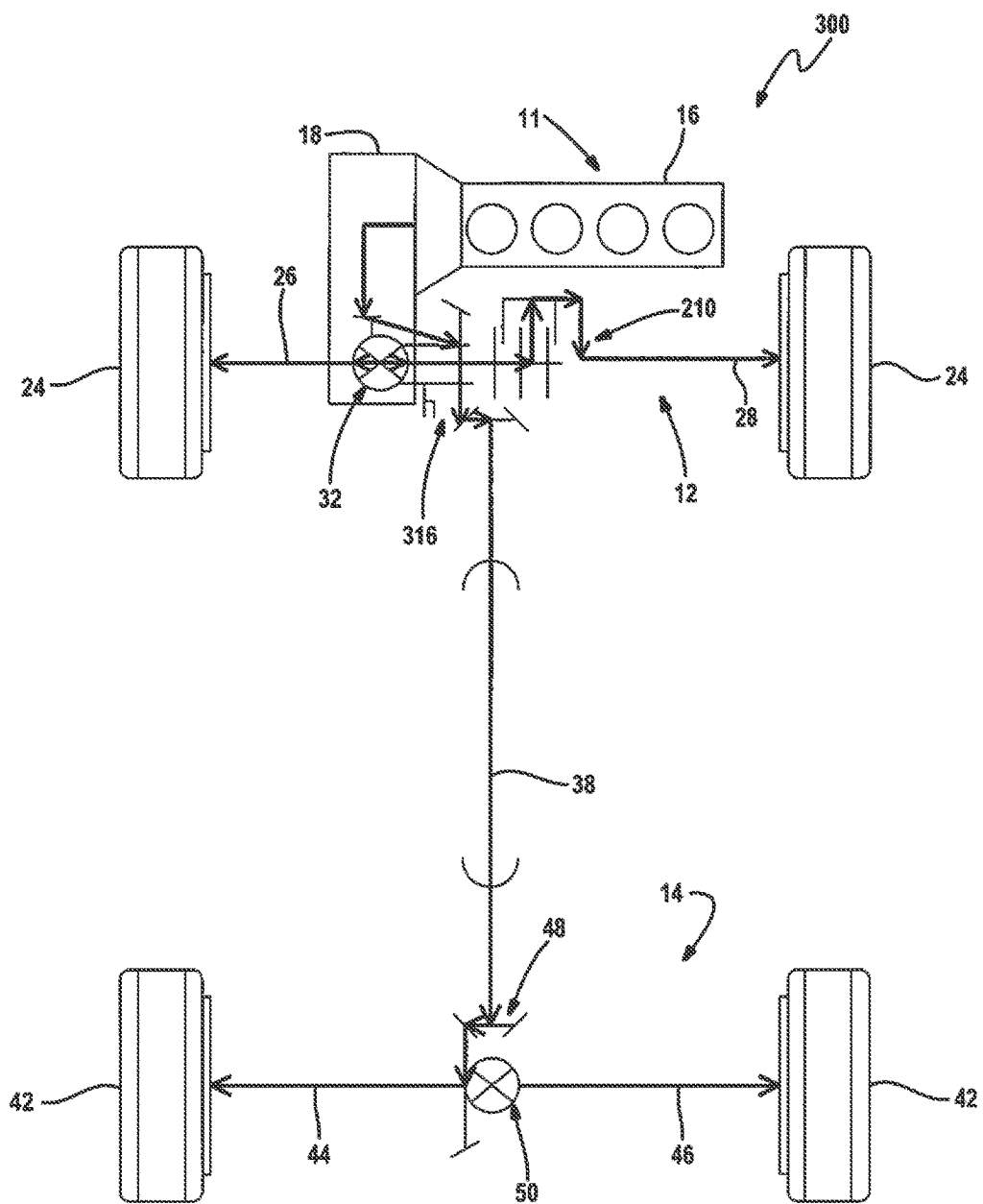
FIGS. 7-9 are powerflow diagrams associated with the vehicle drivetrain arrangement shown in FIG. 4A.
Figure 8:
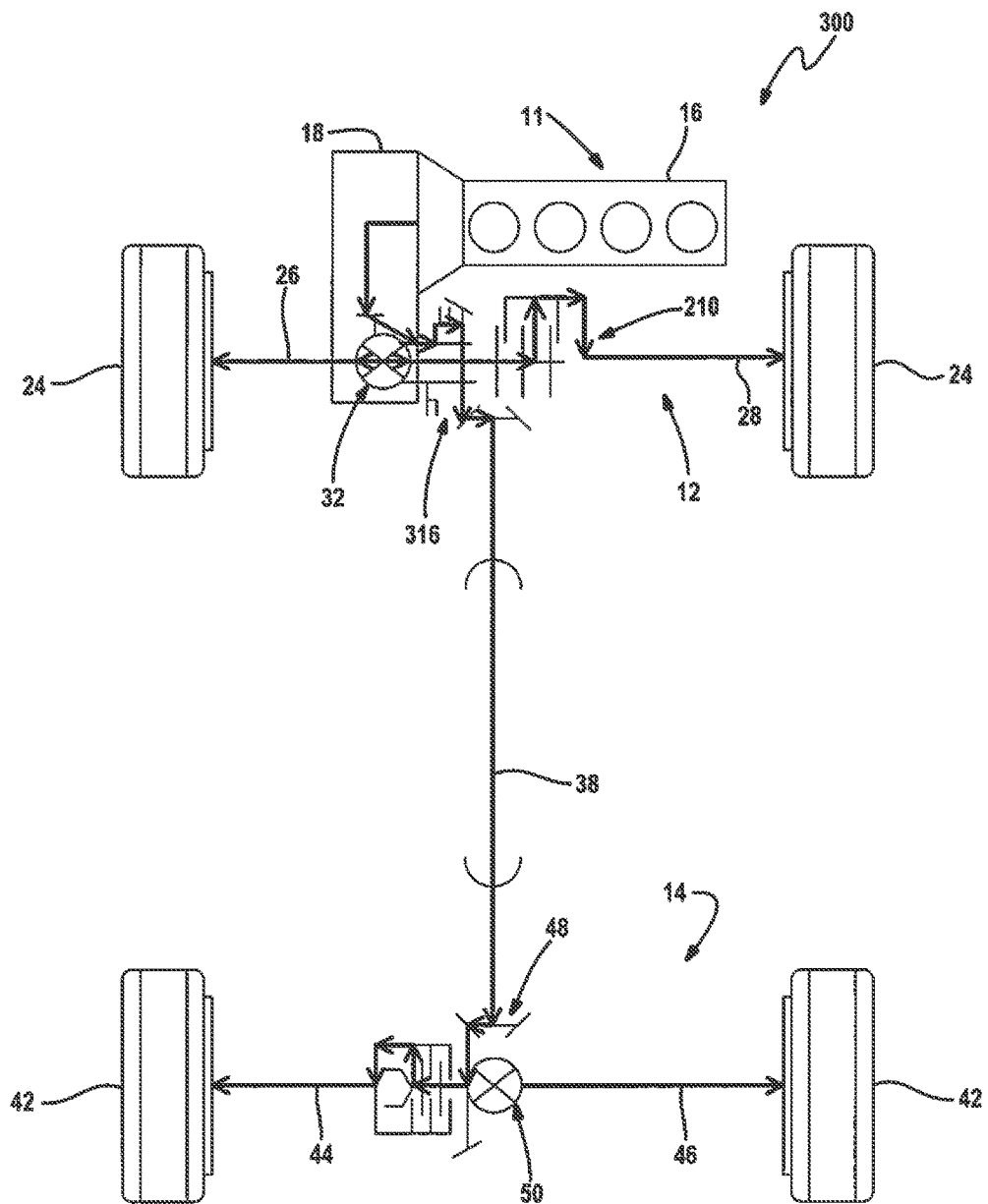
Figure 9:
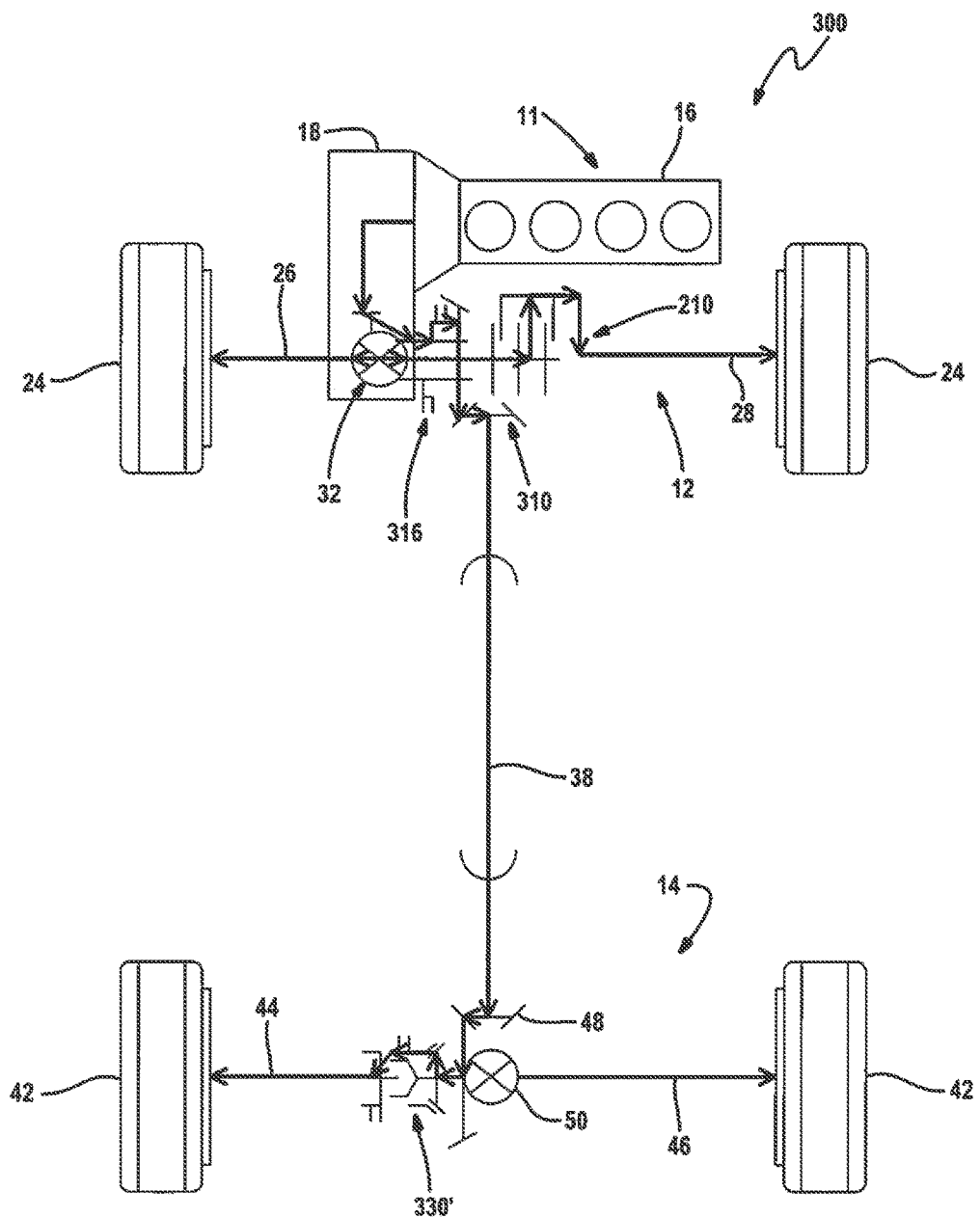

Referring to FIGS. 5 and 6, exemplary powerflow diagrams are provided for drivetrain 200 of FIG. 3. Specifically, FIG. 5 illustrates disconnect clutch 210 released such that all drive torque is delivered from powertrain assembly 11 through PTU 204 to rear driveline 14. In contrast, FIG. 6 illustrates that a portion of the drive torque is transmitted to front driveline 12 when disconnect clutch is engaged. Referring to FIGS. 7 through 10, exemplary powerflow diagrams are provided for drivetrain 300 of FIG. 4A.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drivetrain for a motor vehicle, comprising:
a powertrain assembly configured to transmit drive torque to a front driveline and a rear driveline;
an auxiliary power transfer unit including an input component drivingly connected to said powertrain assembly and an output component operatively connected to said rear driveline, said auxiliary power transfer unit configured to deliver at least a portion of the drive torque to said rear driveline;
a power-operated clutch configured to transmit a portion of said drive torque from said auxiliary power transfer unit to said front driveline when said power-operated clutch is in an engaged state; and
a front differential assembly operatively coupled to said front driveline,
wherein said power-operated clutch is operatively coupled to said front differential assembly, wherein all of the drive torque from said powertrain assembly is conveyed through said auxiliary power transfer unit to said rear driveline to establish a rear-wheel drive mode when said power-operated clutch is in a released state, and at least a portion of the drive torque from said powertrain assembly is conveyed through said auxiliary power transfer unit and said front differential assembly to said front driveline when said power-operated clutch is in said engaged state.

2. The drivetrain of claim 1, wherein said powertrain assembly includes a final drive gearset drivingly connected to said input component of said auxiliary power transfer unit, and further including a propshaft coupled to said output component of said auxiliary power transfer unit and said rear driveline for delivering at least a portion of the drive torque from said powertrain assembly to said rear driveline.

3. The drivetrain of claim 2, wherein said auxiliary power transfer unit includes a hypoid gearset drivingly interconnecting said input component and said output component.

4. The drivetrain of claim 3, wherein said input component of said auxiliary power transfer unit includes a sleeve shaft fixed to a first gear of said hypoid gearset, and said output component of said auxiliary power transfer unit is configured as a pinion shaft.

5. The drivetrain of claim 4, wherein an input component of said front differential is drivingly connected to at least one of said sleeve shaft and said final drive gearset, and said power-operated clutch is fixed to an output of said front differential assembly.

6. The drivetrain of claim 4, wherein said pinion shaft of said auxiliary power transfer unit is fixed to a second gear of said hypoid gearset and said second gear is configured to be in constant mesh with said first gear.

7. The drivetrain of claim 6, wherein said first gear is a ring gear and said second gear is a pinion gear.

8. The drivetrain of claim 3, wherein said hypoid gearset is a right-angled hypoid gearset.

9. The drivetrain of claim 8, wherein said powertrain assembly includes an engine that is transversely aligned with a longitudinal axis of the motor vehicle.

10. The drivetrain of claim 1, wherein said power-operated clutch includes a multi-plate friction clutch unit and a power-operated clutch actuator unit.

11. The drivetrain of claim 10 including a controller configured to adaptively actuate said actuator unit to establish an on-demand all-wheel drive mode.

12. The drivetrain of claim 11, wherein said controller is further configured to modulate a clutch engagement force on said multi-plate friction clutch via said power-operated actuator unit to adaptively vary torque distribution between said front driveline and said rear driveline.

13. The drivetrain of claim 12, wherein said controller is in communication with at least one sensor providing data indicative of current operating parameters of the motor vehicle to determine optimal torque distribution in said on-demand all-wheel drive mode.

14. The drivetrain of claim 1, wherein said front driveline includes a front axle-shaft and said differential assembly includes side gears, and wherein said power-operated clutch is disposed between said front axle-shaft and a stub shaft fixed to one of said side gears.

15. The drivetrain of claim 1, wherein said powertrain assembly is transversely aligned with a longitudinal axis of the motor vehicle and said auxiliary power transfer unit includes a right-angled hypoid gearset drivingly interconnecting said input component to said output component.

16. The drivetrain of claim 15, wherein an input component of said front differential is drivingly connected to said input component of said auxiliary power transfer unit, and said power-operated clutch is fixed to an output of said front differential assembly.

17. The drivetrain of claim 16, wherein said power-operated clutch includes a multi-plate friction clutch unit and a power-operated clutch actuator unit for actuating said power-operated clutch between a released state and an engaged state, wherein in said released state all of the drive torque from said powertrain assembly is conveyed through said power-operated clutch to said rear driveline, and wherein in said engaged state at least a portion of the drive torque from said powertrain assembly is conveyed through said power-operated clutch and said front differential assembly to said front driveline.

18. The drivetrain of claim 17, including a controller configured to adaptively control actuation of said actuator unit to establish an on-demand all-wheel drive mode, and wherein said controller is further configured to modulate clutch engagement force on said multi-plate friction clutch via said power-operated actuator unit to adaptively vary torque distribution between said front driveline and said rear driveline.

19. A drivetrain for a motor vehicle, comprising:
a powertrain assembly configured to transmit drive torque to a front driveline and a rear driveline;
an auxiliary power transfer unit including an input component drivingly connected to said powertrain assembly and an output component operatively connected to said rear driveline, said auxiliary power transfer unit configured to deliver at least a portion of the drive torque to said rear driveline;
a power-operated clutch configured to transmit a portion of said drive torque from said auxiliary power transfer unit to said front driveline when said power-operated clutch is in an engaged state; and
a front differential assembly operatively coupled to said front driveline,
wherein said power-operated clutch is operatively coupled to said front differential assembly, wherein said powertrain assembly is transversely aligned with a longitudinal axis of the motor vehicle and said auxiliary power transfer unit includes a right-angled hypoid gearset drivingly interconnecting said input component to said output component, wherein an input component of said front differential is drivingly connected to said input component of said auxiliary power transfer unit, and wherein said power-operated clutch is fixed to an output of said front differential assembly.

20. A drivetrain for a motor vehicle, comprising:
a powertrain assembly configured to transmit drive torque to a front driveline and a rear driveline;
an auxiliary power transfer unit including an input component drivingly connected to said powertrain assembly and an output component operatively connected to said rear driveline, said auxiliary power transfer unit configured to deliver at least a portion of the drive torque to said rear driveline;
a power-operated clutch configured to transmit a portion of said drive torque from said auxiliary power transfer unit to said front driveline when said power-operated clutch is in an engaged state; and
a front differential assembly operatively coupled to said front driveline,
wherein said power-operated clutch is operatively coupled to said front differential assembly, wherein said powertrain assembly includes a final drive gearset drivingly connected to said input component of said auxiliary power transfer unit, wherein a propshaft is coupled to said output component of said auxiliary power transfer unit and said rear driveline for delivering at least a portion of the drive torque from said powertrain assembly to said rear driveline, wherein said auxiliary power transfer unit includes a hypoid gearset drivingly interconnecting said input component and said output component, wherein said input component of said auxiliary power transfer unit includes a sleeve shaft fixed to a first gear of said hypoid gearset, and said output component of said auxiliary power transfer unit is configured as a pinion shaft, wherein an input component of said front differential is drivingly connected to at least one of said sleeve shaft and said final drive gearset, and wherein said power-operated clutch is fixed to an output of said front differential assembly.

* * * * *